United States Patent
Kim et al.

(10) Patent No.: US 8,576,359 B2
(45) Date of Patent: Nov. 5, 2013

(54) LIQUID CRYSTAL DISPLAY DEVICE AND METHOD FOR MANUFACTURING THE SAME

(75) Inventors: Chang-Hoon Kim, Asan-si (KR); Gug-Rae Jo, Asansi (KR); Min-Uk Kim, Seongnam-si (KR)

(73) Assignee: Samsung Display Co., Ltd. (KR)

( * ) Notice: Subject to any disclaimer, the term of this patent is extended or adjusted under 35 U.S.C. 154(b) by 892 days.

(21) Appl. No.: 12/579,816

(22) Filed: Oct. 15, 2009

(65) Prior Publication Data

US 2010/0157211 A1 Jun. 24, 2010

(30) Foreign Application Priority Data

Dec. 23, 2008 (KR) .......... 10-2008-132430

(51) Int. Cl.
*G02F 1/1335* (2006.01)
(52) U.S. Cl.
USPC .......................... 349/106; 349/43
(58) Field of Classification Search
USPC .................. 349/106, 43
See application file for complete search history.

(56) References Cited

U.S. PATENT DOCUMENTS

| | | | | |
|---|---|---|---|---|
| 4,776,675 A * | 10/1988 | Takaochi et al. | ............ | 349/106 |
| 4,988,168 A | 1/1991 | Dickerson et al. | | |
| 5,946,065 A * | 8/1999 | Tagusa et al. | ................ | 349/138 |
| 6,680,763 B2 * | 1/2004 | Sumino et al. | ............... | 349/106 |
| 7,331,286 B2 | 2/2008 | Baek et al. | | |
| 7,586,121 B2 * | 9/2009 | Sun | ................................... | 257/59 |
| 7,601,406 B2 * | 10/2009 | Garbar et al. | ................. | 428/1.4 |
| 2005/0140858 A1 * | 6/2005 | Park | .............................. | 349/110 |
| 2005/0253984 A1 * | 11/2005 | Kim et al. | ..................... | 349/106 |

FOREIGN PATENT DOCUMENTS

| | | |
|---|---|---|
| JP | 2002-214595 A | 7/2002 |
| JP | 2005-338762 A | 12/2005 |
| JP | 2007-027367 A | 2/2007 |
| JP | 2007-079354 A | 3/2007 |
| KR | 1020010037330 A | 5/2001 |
| KR | 1020050005180 A | 1/2005 |
| KR | 1020050011289 A | 1/2005 |
| KR | 1020070119261 A | 12/2007 |

* cited by examiner

*Primary Examiner* — Edward Glick
*Assistant Examiner* — David Chung
(74) *Attorney, Agent, or Firm* — Cantor Colburn LLP

(57) ABSTRACT

A method of manufacturing a liquid crystal display includes forming a gate line, a data line and a switching element on a first substrate including a pixel area, the switching element including a source electrode and drain electrode, forming a color filter and a conductive contact element on the source electrode of the switching element by a gravure printing method, forming a pixel electrode on the conductive contact element and on the color filter, forming a second substrate including a common electrode, and interposing a liquid crystal layer between the first substrate and the second substrate.

13 Claims, 12 Drawing Sheets

LIQUID CRYSTAL DISPLAY DEVICE AND METHOD FOR MANUFACTURING THE SAME

This application claims priority to Korean Patent Application No. 10-2008-0132430 filed on Dec. 23, 2008 and all the benefits accruing therefrom under 35 U.S.C. §119, the contents of which are herein incorporated by reference in its entirety.

BACKGROUND OF THE INVENTION

1. Field of the Invention

The invention relates to a liquid crystal display device, and manufacturing method for printing a color filter and contact material onto a substrate which reduces manufacturing process and cost.

2. Description of the Related Art

Liquid crystal display devices are being actively developed due to their advantages such as small volume, light weight, little power consumption and large screen compared to typical cathode ray tubes ("CRTs") used as monitors, TVs (televisions), and the like. Recently, there has been a step up to develop technology for increasing display size and reducing cost of LCDs. In particular, technologies for reducing costs are important in terms of achieving general acceptance of color liquid crystal displays. A method of manufacturing color filters has been proposed as one such cost reduction technology, and is described below.

A method of forming color filter such as R (Red), G (Green), and B (Blue) has been photolithography on a glass substrate. However, drawbacks of photolithography processes include the high cost of equipment needed for coating, exposure, development, and so on, as well as low utilization efficiency of the principal materials of the RGB color filters. Consequently, ink-jet processes and printing processes have been proposed as color filter production methods which can replace the photolithography process.

Ink-jet processes have the advantage that alignment of the various color filter patterns can be accomplished through program control. However, susceptibility to nozzle clogging and slow processing speed are potential issues in terms of mass production.

Printing processes are already in use for certain products. Depending on the type of printing plate used or difference in the printing mechanism, printing processes are classified as gravure printing, anastatic printing, planographic printing, reverse printing, and so on. However, in consideration of throughput and the pattern dimensions required for color filters, gravure printing is perhaps best adapted as a color filter production process.

By way of illustration, a color filter production process employing a conventional gravure printing process will be described in detail. FIGS. 1A to 1D are outline diagrams illustrating the manufacturing flow of a conventional color filter substrate, where FIG. 1A is a cross-sectional view of the gravure printing plate being filled with colored ink and a doctoring blade, FIG. 1B is a cross-sectional view after the blanket has received the colored ink, FIG. 1C is a cross-sectional view after transfer of the colored ink to the transparent substrate and FIGS. 1D and 1E are cross-sectional views of the substrate being pressed by a press sheet and pressing apparatus including press roller or press plate, respectively.

As depicted in FIG. 1A, a gravure printing plate 500 including recesses 560 formed thereon is positioned on a stage 10, ink 600 is placed on the edge of the gravure printing plate 500, and a blade 510 is pressed against the gravure printing plate 500 and swept thereover so as to wipe it, thereby filling the recesses 560 with the ink 600. Subsequently, as depicted in FIG. 1B, a blanket 520 is pressed against the gravure printing plate 500 and turned, whereby the ink 600 filling the recesses 560 is accepted onto the blanket 520. The ink 600 is accepted onto the surface of the blanket 520. In consideration of the fact that the ink becomes split when the ink is accepted onto the blanket 520, the depth of the recesses 560 is designed so as to make allowance for the ink left at the bottom of the recesses 560.

Next, as depicted in FIG. 1C, a transparent substrate 110 is placed on the stage 10, and the ink 602 that has been picked up on the blanket 520 is transferred to the transparent substrate 110. The above operation is repeated three times to produce an RGB 3-color filter. Next, as depicted in FIG. 1D and FIG. 1E, a press roller 540 covered with a press sheet 550, or press plate 570 covered with a press sheet 550 press the transferred ink to fill the vacant space.

A plurality of thin film transistor arrays is disposed on a first substrate and a plurality of color filters is disposed on a second substrate in a conventional liquid crystal display. However, the difficulty in controlling the width of the transferred ink in the forming of the color filter during a conventional gravure printing process may cause many drawbacks, such as poor accuracy in alignment of the first substrate and the second substrate. If a miss-alignment occurs, the image quality of the display becomes poor. Additionally, a contact hole in the color filter is required for disposing a conductive contact element to connect a source electrode and a pixel electrode to each other. It is difficult to form the contact hole after a gravure printing method because of residuals.

According to FIGS. 2A to 2C, ink transferred to the substrate has a substantially dome shape. FIG. 2A shows a plan view of the dome-shaped ink transferred to the substrate, FIG. 2B shows a cross-sectional view along line A-A' of FIG. 1 of the dome-shaped ink transferred to the substrate and forming a printed RGB pattern (600G, 600B, 600R), FIG. 2C shows a color filter (600GP, 600BP, 600RP) formed from the printed RGB pattern (600G, 600B, 600R).

Since the ink is transferred directly from the gravure printing plate onto the transparent substrate, a drawback may arise since the three transferred ink patterns have poor dimensional accuracy.

Specifically, when the gravure printing plate including recesses filled with ink is directly pressed against the glass substrate for ink to be transferred thereto, the upper portions of the recesses become splayed by the pressing force, making it difficult to control the width of the transferred ink.

In FIG. 2C, the color filter (600GP, 600BP, 600RP) does not include a contact hole for a conductive contact element to connect a source electrode and a pixel electrode to each other, as a result of the forming of the color filter (600GP, 600BP, 600RP) from the printed RGB pattern (600G, 600B, 600R) during only a conventional gravure printing process. Therefore, cost and time is increased since the contact hole must be formed after the conventional gravure printing method.

Additionally, since the dimensions of the color filter (600GP, 600BP, 600RP) from the printed RGB pattern (600G, 600B, 600R) are not bounded by any control feature, and are defined only by the pressing of the unrestricted RGB pattern (600G, 600B, 600R) during the conventional gravure printing method, a poor accuracy in alignment of the first substrate and the second substrate may be created.

Splitting of the ink during ink transfer can be prevented and the accuracy of the ink pattern improved by filling the recesses of the gravure printing plate with photosensitive ink and then exposing the ink for curing. The accuracy of the ink pattern may be improved further by accelerating the setting rate via a heat treatment or the like.

BRIEF SUMMARY OF THE INVENTION

An exemplary embodiment of the invention relates to a method of manufacturing a liquid crystal display. The method includes forming a gate line, a data line and a switching element on a first substrate including a pixel area, disposing a color filter material and a conductive material on a source electrode of the switching element using a gravure printing method, forming both a color filter from the color filter material, and a conductive contact element from the conducting material at substantially a same time in a single process, forming a pixel electrode on the conductive contact member and on the color filter, forming a common electrode on a second substrate facing the first substrate, and forming a liquid crystal layer between the first substrate and the second substrate.

In an exemplary embodiment, the conductive contact member includes a conductive ink material. The conductive ink material includes a nano-material including at least one of Ag, Cu, Au, indium-tin-oxide. The color filter may include red, green and blue color filters. After forming the color filters including red, green and blue color filter, the color filters may be pressed by a press roll or a press plate and planarized. The extension amount of the conductive ink material is less than that of color filter while a pressing process is applied.

When the color filters including different colors such as red, green and blue, and the conductive ink material are pressed and planarized at the same time, the color filters meet one another and may make a border line or may overlap one another.

The conductive material may be disposed with printing by a gravure off-set print method or a reverse off-set print method.

In another exemplary embodiment, the method includes forming an organic layer between the color filter and the pixel electrode.

In another exemplary embodiment, a method of manufacturing a liquid crystal display may include forming a gate line, a data line and a switching element on a first substrate including a pixel area, forming a color filter on a source electrode of the switching element by a gravure printing method, forming a contact hole in the color filter, forming a plurality of contact members on the contact hole, forming an organic layer on the color filter and the contact member, ashing the organic layer on the contact member, forming a pixel electrode directly on the contact members and the organic layer, forming a common electrode on a second substrate facing the first substrate, and forming a liquid crystal layer between the first substrate and the second substrate.

In another exemplary embodiment, a liquid crystal display may include a first substrate including a pixel area, a gate line and a data line intersecting the gate line, a switching element including a gate electrode, a drain electrode, a source electrode including a connection portion in the pixel area, a color filter formed on the data lines, a contact member including a conductive ink material, a pixel electrode connected to the connection portions of the source electrode by the contact member, a second substrate including a common electrode facing the first substrate, and a liquid crystal formed between the first substrate and the second substrate. The conductive ink material includes nano-material including at least one of Ag, Cu, Au, indium-tin-oxide.

In another exemplary embodiment, a liquid crystal display may include an organic layer disposed between the color filter and the pixel electrode.

BRIEF DESCRIPTION OF THE DRAWINGS

The features of the invention can be better understood with reference to the drawings described below, and the claims. The drawings are not necessarily to scale, emphasis instead generally being placed upon illustrating the principles of the invention. In the drawings, like numerals are used to indicate like parts throughout the various views.

DETAILED DESCRIPTION OF THE INVENTION

Figure 1A:
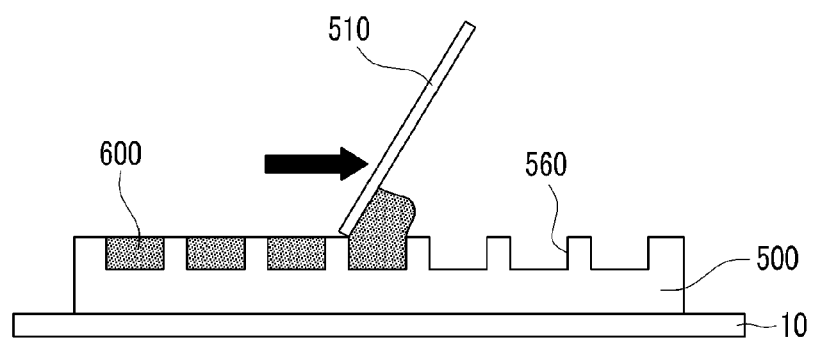
FIG. 1A to FIG. 1E show process flows of a conventional gravure printing method.
Figure 1B:
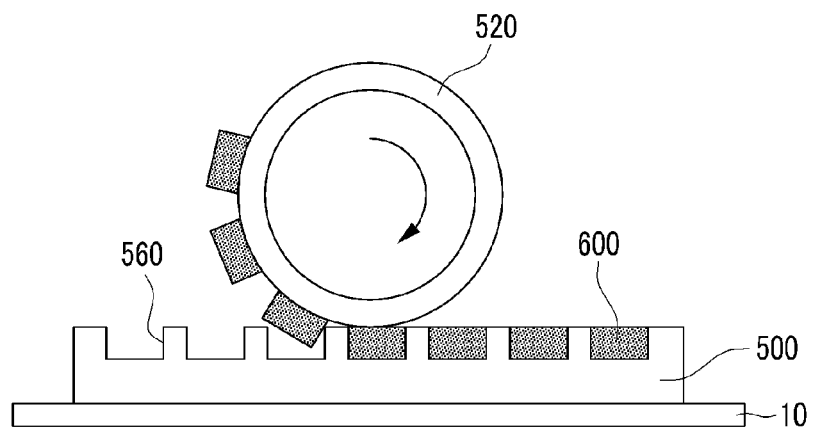
Figure 1C:
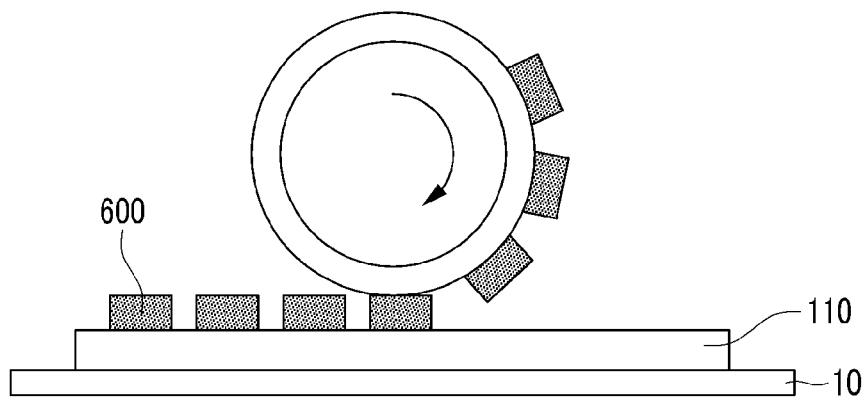

The invention is described more fully hereinafter with reference to the accompanying drawings, in which exemplary embodiments of the invention are shown. This invention may, however, be embodied in many different forms and should not be construed as limited to the exemplary embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity. It will be understood that when an element or layer is referred to as being "on" or "connected to" another element or layer, the element or layer can be directly on or connected to another element or layer or intervening elements or layers. In contrast, when an element is referred to as being "directly on" or "directly connected to" another element or layer, there are no intervening elements or layers present. Like numbers refer to like elements throughout. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the invention.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative to the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the invention as used herein.

Reference will now be made in detail to exemplary embodiments of the invention which are illustrated in the accompanying drawings.

The invention in an exemplary embodiment provides a liquid crystal device formed by gravure printing and a method of manufacturing a liquid crystal device including an RGB pattern of a COA (color filter on array) structure with less process and cost. While a contact hole in the RGB pattern is required for disposing a conductive contact element to connect a source electrode and a pixel electrode to each other, it is difficult to form the contact hole after a gravure printing method because of residuals. However, in an exemplary embodiment of the invention, a conductive material processed during the forming of the RGB pattern, may be used to form the conductive contact element in the liquid crystal device to connect the source electrode and the pixel electrode to each other. During the forming of the RGB pattern, a shape of the conductive material and/or a size of the conductive material can be controlled, such as by pressing, to form the required conductive contact element to connect a source electrode and a pixel electrode to each other.

A exemplary embodiment of the invention will now be described in detail with reference to the accompanying drawings.

Figure 3:
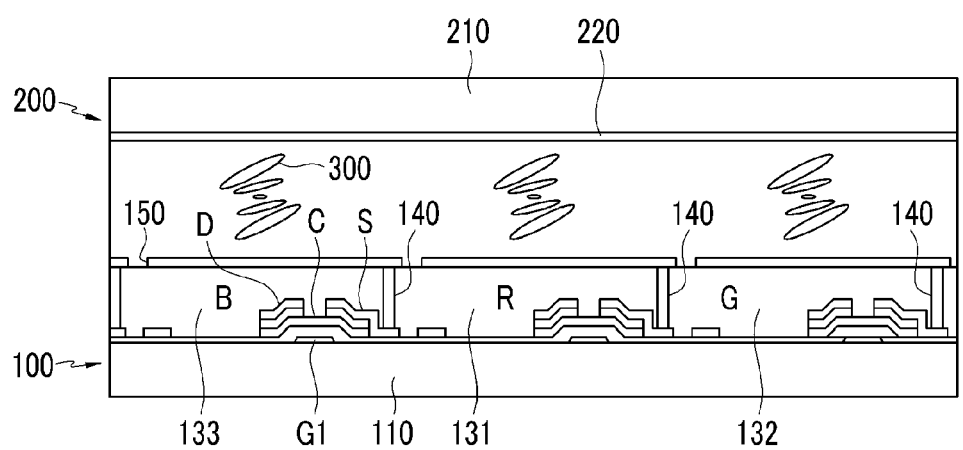
FIG. 3 shows an exemplary embodiment of a liquid crystal display, according to the invention.

FIG. 3 shows an exemplary embodiment of a liquid crystal display and a cross-sectional view of the exemplary embodiment. The liquid crystal display includes a first substrate 100 and a second substrate 200 facing the first substrate 100. In the illustrated embodiment of the invention, the first substrate 100 includes a gate line G1, a data line D and a switching element disposed on a first insulating substrate 110, including a pixel area defined thereon. A color filter (collectively 131, 132, 133) and a conductive contact element 140 are formed on a source electrode S of the switching element, such as by using a gravure printing method. The conductive contact element 140 is electrically connected to a connection portion C of the source electrode 30, and may be a single unitary and indivisible member as shown in FIG. 3. A pixel electrode 150 is disposed directly on and contacting a portion of both the conductive contact element 140, and the color filter (131, 132, 133).

The second substrate 200 includes a common electrode 220 disposed on a second insulating substrate 210 facing the first insulating substrate 110. A liquid crystal layer 300 is disposed between the first substrate 100, and a second substrate 200 including the second insulating substrate 210 and the common electrode 220.

A contact material of the conductive contact element 140 may be used, such as a conductive ink material, selected from at least one of Ag, Cu, Au, indium-tin-oxide. The conductive ink material may include at least one of a binder polymer, a leveling agent which controls the viscosity of the ink material, and a rheology control agent. The leveling agent may include a silicon radical or fluorine radical polymer. The rheology control agent may include silica, or urethane type polymer.

When the binder polymer, the leveling agent and/or the rheology control agent are added to the ink material, an extension of a conductive ink material may be controlled. In exemplary embodiments, the extension of a conductive ink material should be less than an extension of color filters to maintain image quality.

In an exemplary embodiment of a printing method in forming the color filters and/or the conductive contact element 140, the printing method of the conductive ink material may include a gravure off-set printing or a reverse off-set printing method.

FIG. 4A to FIG. 4H show an exemplary embodiment of a process flow of manufacturing a liquid crystal display, according to the invention.

Figure 4A:
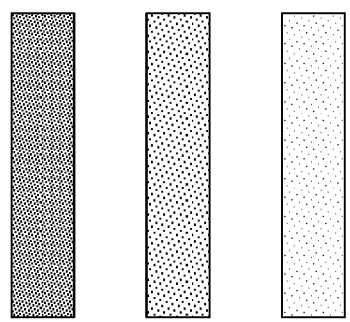
FIG. 4A to FIG. 4H show an exemplary embodiment of a process flow of manufacturing a liquid crystal display, according to the invention.
Figure 4B:
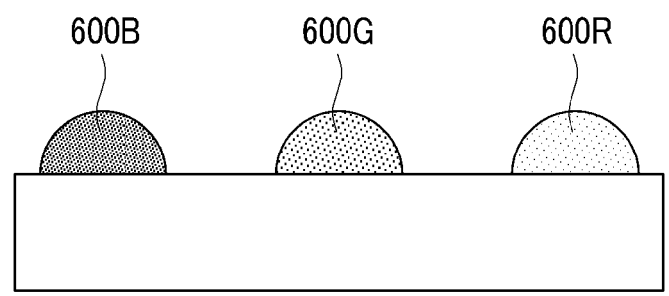
Figure 4C:
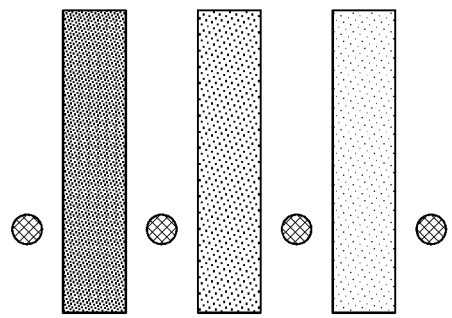

FIG. 4A and FIG. 4C show only an RGB pattern (600G, 600B, 600R) of a COA structure printed on a substrate, and both an RGB pattern (600G, 600B, 600R) and a conductive ink 130 of a COA structure printed on a substrate, respectively. The conductive ink 130 may be disposed between the RGB pattern (600G, 600B, 600R), in a plan view, as shown in FIG. 4C. The RGB pattern (600G, 600B, 600R) may be printed on the substrate in one process, such as shown in FIGS. 4A and 4B, and then the conductive ink 130 subsequently printed on the substrate in another process to result in the view of FIGS. 4C and 4D. Alternatively, both the RGB pattern (600G, 600B, 600R) and the conductive ink 130 may be printed on the substrate in a single process to result in the view of FIGS. 4C and 4D.

Figure 1D:
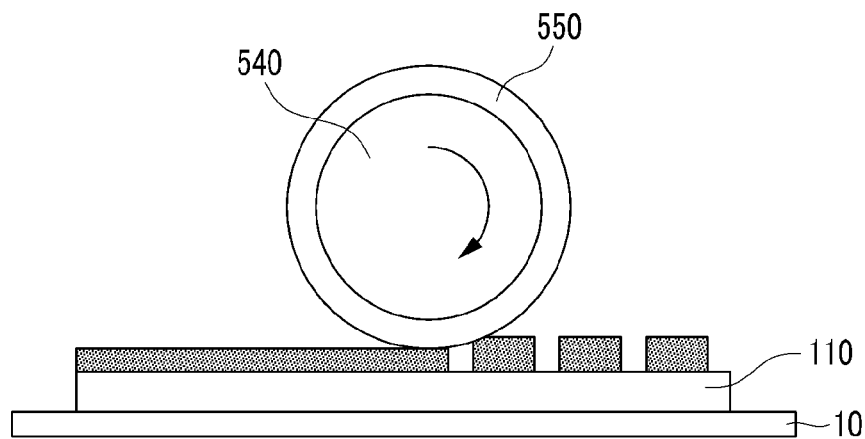
Figure 1E:
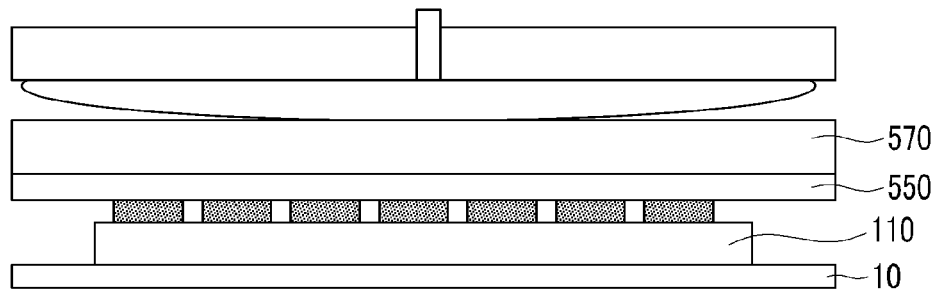
Figure 2A:
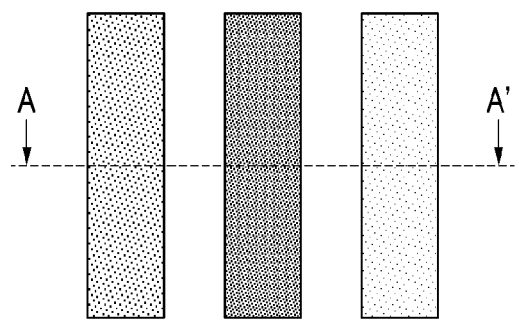
FIG. 2A to FIG. 2C show cross-sectional views of conventional color filter patterns.
Figure 2B:
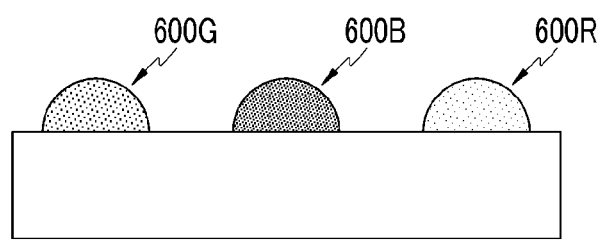
Figure 2C:
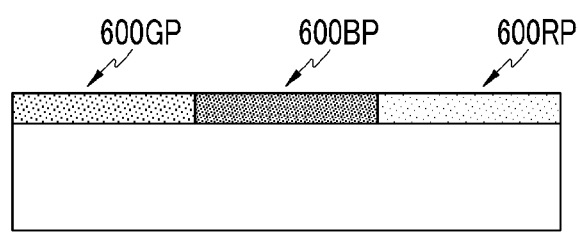
Figure 4D:
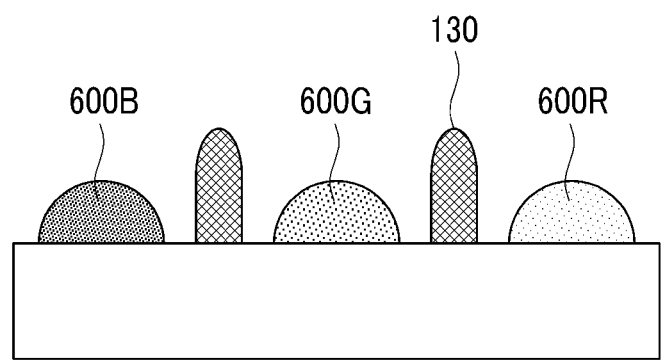

As shown in FIGS. 4B and 4D, the printed conductive ink 130 and/or the printed color filter (600G, 600B, 600R) may have substantially a shape of a dome when initially formed (e.g., printed) on the substrate. To form the liquid crystal display, the dome shape should be planarized to form a substantially flat (e.g. planar) surface. The planarizing method may include a since process roll press method which presses the initially printed dome shaped conductive ink 130 or initially printed dome shaped color filter (600G, 600B, 600R), such as by rotating a roller 540 shown in FIG. 1D, to planarize the printed conductive ink 130 or the printed color filter (600G, 600B, 600R). Alternatively, the planarizing method may include a single process press plate method which presses the initially printed dome shaped conductive ink 130 or printed color filter (600G, 600B, 600R), such as by a plate 570 shown in FIG. 1E to planarize the dome shaped conductive ink 130 or the printed color filter (600G, 600B, 600R).

Figure 4E:
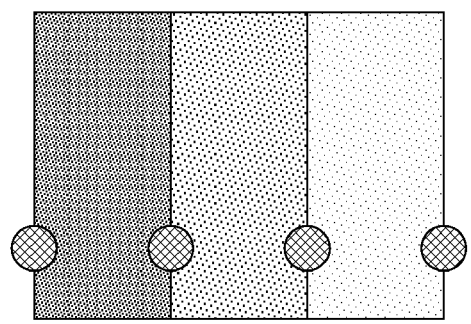
Figure 4F:
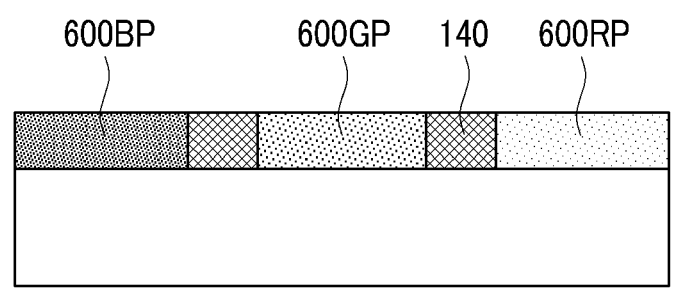

FIG. 4E and FIG. 4F show the printed RGB pattern (600G, 600B, 600R) and the conductive ink 130 after being planarized, such as by the single process pressing, and subsequently cured. After the single process pressing, a space between the individual members of the RGB pattern (600G, 600B, 600R) decreases or disappears. Portions of the RGB pattern (600G, 600B, 600R) and the conductive ink 130 fills such a space solely as a result of the expanding of the RGB pattern (600G, 600B, 600R) and the conductive ink 130 due to the single process pressing. The forming the color filter including different colors includes the different colored filters meeting and overlapping each other through a single pressing process.

To form an ideal pattern like FIG. 4E by the single process pressing, an extension amount of the conductive ink 130 must be less than an extension amount of the RGB pattern (600G, 600B, 600R). In other words, the RGB pattern (600G, 600B, 600R) interrupts the conductive ink 130 from expanding during pressing of the printed RGB pattern (600G, 600B, 600R) and the conductive ink 130 in the single planarizing process. The transfer and expanding of the RGB pattern (600G, 600B, 600R) and the conductive ink 130 are effectively restricted as a direct result of the printed RGB pattern (600G, 600B, 600R) and the conductive ink 130 alternating with each other, such that the RGB pattern (600G, 600B, 600R) interrupts the conductive ink 130 from expanding during the pressing. Materials used for the RGB pattern (600G, 600B, 600R) and the conductive ink 130 may also contribute to the direct result of the restriction of the expanding of the RGB pattern (600G, 600B, 600R) and the conductive ink 130 during the single planarizing process.

The printed RGB pattern (600G, 600B, 600R) forms a color filter (600GP, 600BP, 600RP) and the conductive ink 130 forms a conductive contact element 140 after a pressing process. The individual members 600BP, 600GP and 600RP of the final color filter illustrated in FIGS. 4E and 4F, are disposed alternating with the formed conductive contact elements 140 on a surface of the substrate. Each of the conductive contact elements 140 directly contacts an adjacent member of the color filter (600GP, 600BP, 600RP), respectively. An upper surface of the color filter (600GP, 600BP, 600RP) and the conductive contact element 140 collectively formed by upper surfaces of the formed conductive contact elements 140 and the color filter (600GP, 600BP, 600RP), is a continuous planar surface. Each of the upper surfaces of the formed conductive contact elements 140 and the color filter (600GP, 600BP, 600RP) are coplanar with each other, as illustrated in FIG. 4F.

Figure 4G:
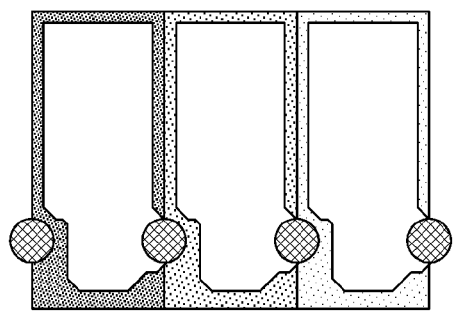
Figure 4H:
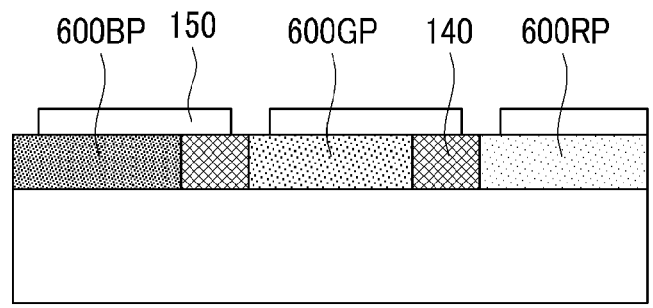

FIG. 4G and FIG. 4H show a pixel electrode 150 disposed directly on and overlapping both the color filter (600GP, 600BP, 600RP) and the conductive contact element 140.

Since the conventional gravure printing method alone does not form a contact hole for a conductive contact element to connect a source electrode and a pixel electrode to each other at substantially the same time as the forming of the color filter (600GP, 600BP, 600RP) from the printed RGB pattern (600G, 600B, 600R), a cost and time is increased since the contact hole must be formed separate from and after the conventional gravure printing method. In contrast, the exemplary embodiment of the invention forms not only the contact hole, but also forms the conductive contact element at substantially the same time as the forming of the color filter (600GP, 600BP, 600RP) from the printed RGB pattern (600G, 600B, 600R), in a single process, such as the pressing. Therefore, a cost and time is reduced since the contact hole and the conductive contact element do not need to be formed subsequent to forming the color filter (600GP, 600BP, 600RP). the illustrated exemplary embodiment of the invention, the cost of manufacture and the number of processes and apparatus used to manufacture LCD device may be decreased.

Figure 5A:
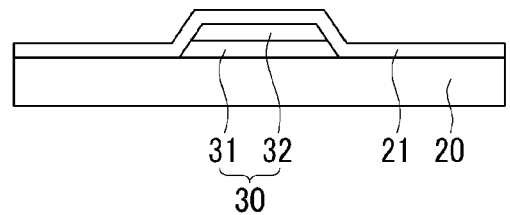
FIG. 5A to FIG. 5H show another exemplary embodiment of a process flow of manufacturing a liquid crystal display, according to the invention.

FIGS. 5A-5H show another exemplary embodiment of a process flow of manufacturing a liquid crystal display, according to the invention. As shown in FIG. 5A, a source electrode 30 including a first layer 31 and a second layer 32 is formed on a substrate 20, and an insulating layer 21 is formed on the substrate 20 and the source electrode 30. The insulating layer 21 is deposited with a material selected from at least one of SiNx or SiO2. The source electrode 30 may be formed with a single layer or multilayer.

Figure 5B:
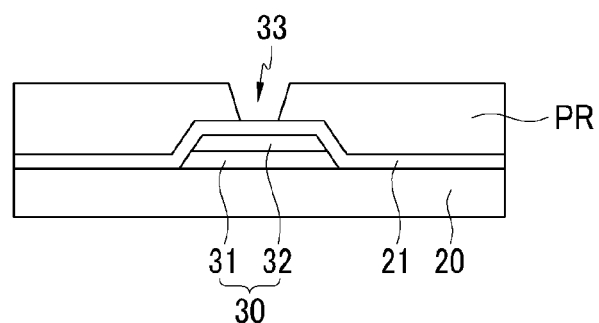
Figure 5C:
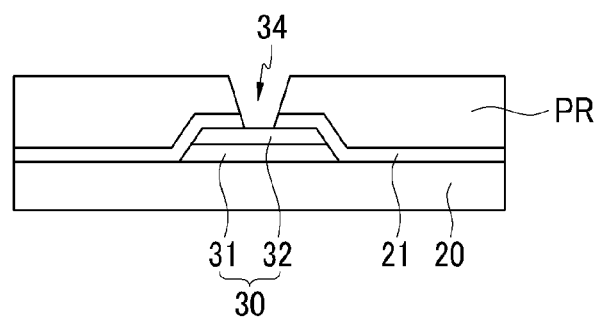

After forming the insulating layer 21, a photoresistor pattern PR may be formed to include a gap 33 in the photoresistor pattern PR overlapping the source electrode 30, as shown in FIG. 5B. After patterning the photoresistor pattern PR, a contact hole 34 may be formed extending completely through the insulating layer 21 and exposing a connection portion C (FIG. 3) the source electrode 30, such as by an etching process as shown in FIG. 5B. The contact hole 34 is an enclosed opening penetrating the insulating layer 21 and the color filter (600RP, 600GP, 600BP), where the insulating layer 21 and the color filter (600RP, 600GP, 600BP) solely define the contact hole 34. After making the contact hole 34 at a site where a contact element may be formed, a conductive ink material may be deposited, such as using a gravure printing method, such that the conductive ink material is disposed in the contact hole 34.

When the contact hole 34 is formed, a characteristic of a process dry etching a metal element, such as Cu included in the RGB color photo resistor, may have disadvantages. Other methods may be used to form a contact hole in the insulating layer 21 (e.g., an organic wall) by dry-etching, or dry-etching and planarizing an organic layer. However, there are many drawbacks in forming the contact hole, such as non-uniformity of dimensions or location of the contact hole and a additional and relatively longer process time for forming the contact hole.

Figure 5D:
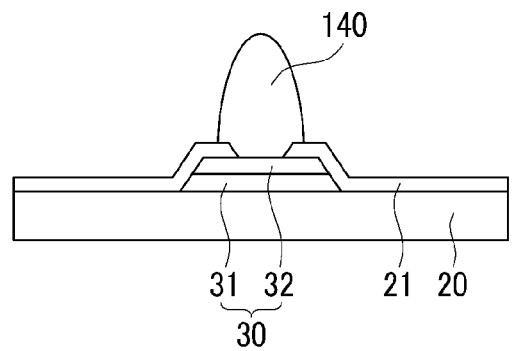

In the illustrated exemplary embodiment, a conductive contact element 140 including a conductive ink material, may be disposed on and completely filling the contact hole 34, as shown in FIG. 5D.

Figure 5E:
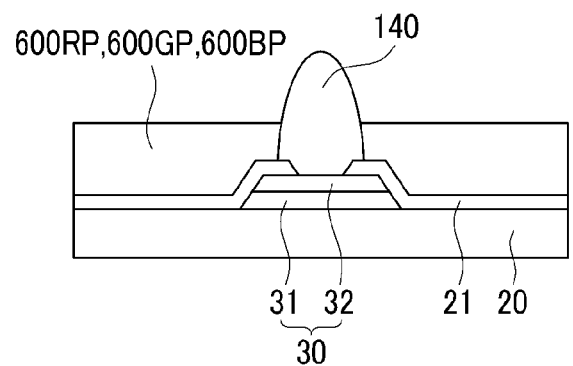

As shown in FIG. 5E, a color filter (600RP, 600GP, 600BP) may be formed directly on and contacting both an upper surface of the insulating layer 21 and an exposed portion of the source electrode 30. After forming the conductive contact element 140 including the conductive ink material, the color filter (600RP, 600GP, 600BP) may be formed without any gap or vacant space between the conductive contact element 140 and the color filter (600RP, 600GP, 600BP). The forming of the color filter (600RP, 600GP, 600BP) such that the conductive contact element 140 directly contacts the color filter (600RP, 600GP, 600BP) (e.g., resulting in no gap therebetween), may be accomplished by printing color filters in a single process, such as by ink jet printing or a gravure printing method.

Figure 5F:
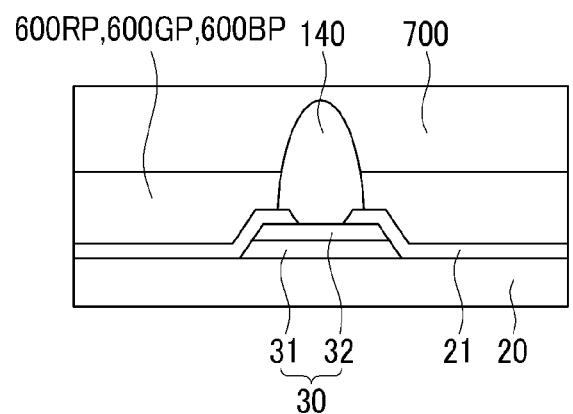

After forming the color filter (600RP, 600GP, 600BP), an organic layer 700 is formed (e.g., coated) further to planarize the structure including the formed color filter on array, in accordance with the invention as shown in FIG. 5F. The organic layer 700 forms an uppermost layer of the formed color filter on array, and includes a continuous flat (e.g., planar) upper surface. The conductive contact element 140 may not exposed when the organic layer 700 is firstly formed.

Figure 5G:
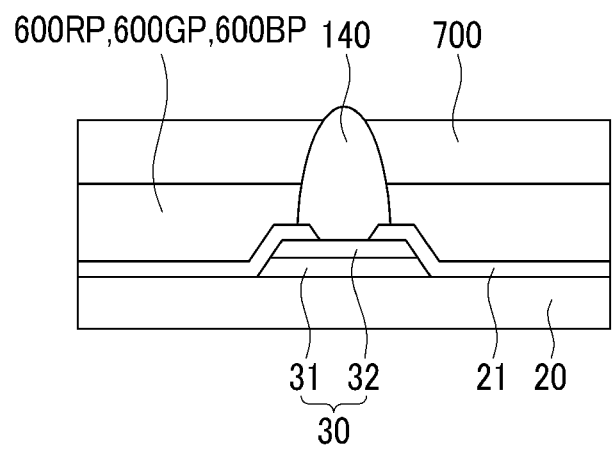

Since the coated organic layer may cover the conductive contact element 140 such that the conductive contact element 140 is not exposed, a portion of the covering organic layer 700 should be eliminated to expose the conductive contact element 140 as shown in the FIG. 5G. The portion of the organic layer 700 overlapping a distal end of the conductive contact element 140 may be removed by ashing. The conductive contact element 140 may be exposed out of the surface of the organic layer 700 after the removing of the portion of the organic layer 700.

Figure 5H:
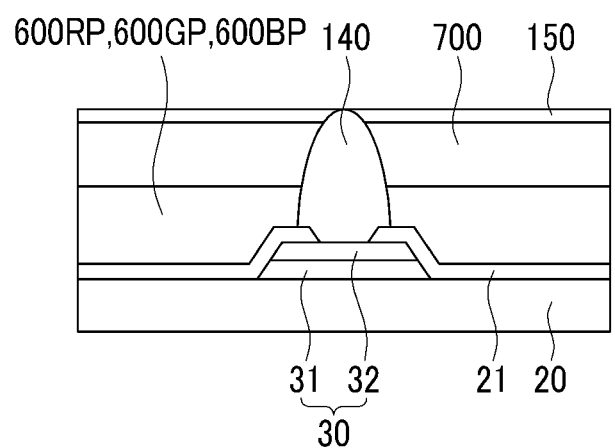

A pixel electrode 150 may be formed directly on the upper surface of the organic layer, and may include materials such as indium tin oxide ("ITO"), indium zinc oxide ("IZO") and the like, as shown in FIG. 5H. The pixel electrode 150 is electrically connected to the source electrode 30 through the conductive element 140 disposed directly adjacent and contacting the color filter (600RP, 600GP, 600BP).

Since the conventional gravure printing method alone does not form a contact hole for a conductive contact element to connect a source electrode and a pixel electrode to each other at substantially the same time as the forming of the color filter (600GP, 600BP, 600RP) from the printed RGB pattern (600G, 600B, 600R), a cost and time is increased since the contact hole must be formed separate from and after the conventional gravure printing method. In contrast, the exemplary embodiment of the invention forms not only the contact hole with the gap between adjacent members of the color filter (600GP, 600BP, 600RP), but also forms the conductive contact element within formed contact hole without any further processing of the color filter (600GP, 600BP, 600RP). Therefore, a cost and time is reduced since the contact hole does not need to be formed in an additional process performed subsequent to forming the color filter (600GP, 600BP, 600RP).

While the invention has been described in detail with reference to the exemplary embodiments, those skilled in the art will appreciate that various modifications and substitutions can be made thereto without departing from the spirit and scope of the invention as set forth in the appended claims.

What is claimed is:

1. A method of manufacturing a liquid crystal display, the method comprising:
    forming a gate line, a data line and a switching element on a first substrate including a pixel area, the switching element including a source electrode and drain electrode,
    disposing a color filter material, and a conductive material separated by a space from the color filter material, on the source electrode of the switching element by a gravure printing method,
    reducing the space between the color filter material and the conductive material by a single process, to form both a color filter from the disposed color filter material, and a conductive contact element from the disposed conductive material, at substantially a same time in the single process;
    forming a pixel electrode on the conductive contact element;
    forming a second substrate including a common electrode; and
    interposing a liquid crystal layer between the first substrate and the second substrate.

2. The method of claim 1,
    wherein the conductive contact element includes a conductive ink material.

3. The method of claim 2,
    wherein the conductive ink material comprises a nanomaterial including at least one of Ag, Cu, Au, indium-tin-oxide.

4. The method of claim 1,
    wherein the color filter includes red, green and blue color filters.

5. The method of claim 4, wherein the single process of forming a color filter includes a press process of pressing the red, green and blue color filters at substantially the same time by a press roll.

6. The method of claim 1,
    wherein the disposing the conductive material includes a gravure off-set print method.

7. The method of claim 1,
    wherein the disposing the conductive material includes a reverse off-set print method.

8. The method of claim 5,
    wherein the press process planarizes both the color filter and the conductive contact element.

9. The method of claim 8, wherein, in the planarizing both the color filter and the conductive contact element,
    both the disposed color filter material and the disposed conductive material expand by an extension amount from an initial shape, respectively, and
    the extension amount of the conductive contact member is less than the extension amount of the color filter.

10. The method of claim 4,
    wherein the forming the color filter including different colors includes the different colored filters meeting and overlapping each other through a single pressing process.

11. A method of manufacturing a liquid crystal display, the method comprising:
    forming a gate line, a data line, a switching element including a source electrode and a drain electrode, and a pixel electrode connected to the switching element through a contact hole, on a first substrate including a pixel area, wherein the contact hole exposes a portion of the source electrode of the switching element;
    forming a conductive contact element in the contact hole and contacting the exposed portion of the source electrode;
    forming a first color filter and a second color filter on the source electrode of the switching element by a gravure printing method, wherein the forming first and second color filters contacts the first color filter with a first side of the conductive contact element and contacts the second color filter with a second side of the conductive contact element opposing the first side;
forming an organic layer on an upper surface of both the color filter and the conductive contact element;
ashing the organic layer disposed on the conductive contact element;
forming a pixel electrode directly on and overlapping both the conductive contact element and the organic layer;
forming a second substrate including a common electrode; and
interposing a liquid crystal layer between the first substrate and the second substrate.

12. A liquid crystal display, comprising:
a first substrate;
a switching element disposed on the first substrate and including a gate electrode, a drain electrode, and a source electrode;
a first color filter and a second color filter disposed separated from each other on the source electrode, wherein the first color filter and the second color filter do not overlap each other;
a conductive contact element including a conductive ink material disposed on and contacting the source electrode,
wherein the first color filter contacts a first side of the conductive contact element and the second color filter contacts a second side of the conductive contact element opposing the first side;
a pixel electrode contacting and connected to the conductive contact element disposed between the portions of the color filter;
an organic layer disposed between the color filter and the pixel electrode;
a second substrate; and
a liquid crystal interposed between the first substrate and the second substrate.

13. The liquid crystal display of claim 12, wherein the conductive ink material includes nano-material including at least one of Ag, Cu, Au, indium-tin-oxide.

* * * * *